US007946491B2

(12) United States Patent
Burian et al.

(10) Patent No.: US 7,946,491 B2
(45) Date of Patent: May 24, 2011

(54) METHOD, APPARATUS, AND COMPUTER PROGRAM PRODUCT FOR PROVIDING A CAMERA BARCODE READER

(75) Inventors: Adrian Burian, Tampere (FI); Jari A. Kangas, Tampere (FI); Markku Vehvilainen, Tampere (FI)

(73) Assignee: Nokia Corporation, Espoo (FI)

( * ) Notice: Subject to any disclaimer, the term of this patent is extended or adjusted under 35 U.S.C. 154(b) by 1329 days.

(21) Appl. No.: 11/462,152

(22) Filed: Aug. 3, 2006

(65) Prior Publication Data

US 2008/0029602 A1 Feb. 7, 2008

(51) Int. Cl.
*G06K 7/10* (2006.01)
*G08C 21/00* (2006.01)

(52) U.S. Cl. ......... 235/462.07; 235/462.01; 235/462.09; 235/462.11; 235/462.14; 235/462.15; 235/462.16; 235/462.22; 235/462.23; 235/462.25; 235/462.45; 235/462.49; 235/472.01; 235/472.02; 235/472.03

(58) Field of Classification Search ............. 235/462.07, 235/462.09, 462.08, 462.25, 462.14, 462.27, 235/462.41, 462.01, 462.11, 462.15, 462.16, 235/462.22, 462.23, 462.45, 462.49, 472.01–472.03; 382/173–180, 224
See application file for complete search history.

(56) References Cited

U.S. PATENT DOCUMENTS

| | | | |
|---|---|---|---|
| 5,867,593 A * | 2/1999 | Fukuda et al. ............... 382/176 |
| 6,585,159 B1 * | 7/2003 | Meier et al. ............... 235/462.31 |
| 6,688,525 B1 * | 2/2004 | Nelson et al. ............. 235/462.21 |
| 7,051,937 B2 | 5/2006 | Albertelli et al. |
| 7,237,721 B2 | 7/2007 | Bilcu et al. |
| 2002/0110269 A1 * | 8/2002 | Floeder et al. ............... 382/141 |
| 2003/0178490 A1 | 9/2003 | Albertelli et al. |
| 2003/0218069 A1 * | 11/2003 | Meier et al. ............... 235/462.25 |
| 2005/0103858 A1 * | 5/2005 | Zhu et al. .................. 235/462.22 |
| 2006/0280363 A1 * | 12/2006 | Umeda ........................ 382/167 |
| 2007/0095916 A1 * | 5/2007 | Joseph et al. ................. 235/454 |

FOREIGN PATENT DOCUMENTS

| | | |
|---|---|---|
| EP | 0 825 547 | 2/1998 |
| JP | 08032418 | 2/1996 |
| WO | WO 97/14110 | 4/1997 |
| WO | WO 03/083762 A1 | 10/2003 |
| WO | WO 2007/012986 A1 | 2/2007 |

OTHER PUBLICATIONS

E. Ohbuchi et al., *Barcode Readers Using the Camera Device in Mobile Phones*, Proceedings of the 2004 International Conference on Cyberworlds, pp. 260-265, Nov. 2004.
E. Octaviani et al., *A Common Image Processing Framework for 2D Barcode Reading*, Seventh International Conference on Image Processing and Its Application, vol. 2, pp. 652-655, Jul. 1999.
A. Burian et al., *Document Image Binarization Using the Camera Device in Mobile Phones*, IEEE International Conference on Image Processing ICIP2005, vol. II, pp. 546-549, Sep. 2005.

* cited by examiner

*Primary Examiner* — Thien M. Le
*Assistant Examiner* — Tuyen K Vo
(74) *Attorney, Agent, or Firm* — Alston & Bird LLP

(57) ABSTRACT

An apparatus for providing a camera barcode reader includes a processing element configured to process an input image for an attempt to decode the input image using a current barcode reading method, to determine whether the processing of the input image is successful, to switch to one of a different barcode reading method or processing a new frame of the input image using the current barcode reading method in response to the processing of the input image being unsuccessful, to attempt a decode of the input image using the current barcode reading method in response to the processing of the input image being successful, and to perform a switch to the different barcode reading method in response to a failure of the attempt to decode the input image using the first barcode reading method.

41 Claims, 7 Drawing Sheets

METHOD, APPARATUS, AND COMPUTER PROGRAM PRODUCT FOR PROVIDING A CAMERA BARCODE READER

TECHNOLOGICAL FIELD

Embodiments of the present invention relate generally to barcode reading technology and, more particularly, relate to a method, apparatus and computer program product for providing a camera barcode reader.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer and convenience to users relates to provision of various applications or software to users of electronic devices such as a mobile terminal. The applications or software may be executed from a local computer, a network server or other network device, or from the mobile terminal such as, for example, a mobile telephone, a mobile television, a mobile gaming system, video recorders, cameras, etc, or even from a combination of the mobile terminal and the network device. In this regard, various applications and software have been developed and continue to be developed in order to give the users robust capabilities to perform tasks, communicate, entertain themselves, gather and/or analyze information, etc. in either fixed or mobile environments.

An example of an application that may be used to gather and/or analyze information is a barcode reader. While barcodes have been in use for about half a century, developments related to utilization of barcodes have recently taken drastic leaps with the infusion of new technologies. For example, new technology has enabled the development of barcodes that are able to store product information of increasing detail. Barcodes have been employed to provide links to related sites such as web pages. Additionally, barcode systems have been developed which move beyond typical one dimensional (1D) barcodes to provide multiple types of potentially complex two dimensional (2D) barcodes. Along with changes related to barcode usage and types, new devices have been developed for reading barcodes. In the past, barcode readers were often devices which irradiate light onto a barcode and receive reflected light from stripe patterns composed of black and white lines in order to detect the barcode. However, cameras and laser scanners have also been developed which are capable of performing barcode reading operations. Given the ubiquitous nature of cameras in mobile terminal devices, it may be increasingly advantageous to provide barcode reading capabilities that could be employed on such mobile terminal devices.

Unfortunately, camera images are often more difficult to accurately recognize than scanner images. This phenomenon may be related to a number of factors. First, uneven lighting or aberrations on a camera lens may lead to non-uniform brightness or uneven lighting, which may render a camera image less accurate. Second, the color level surface of a camera image is smoother than that of a scanner image. In other words, edges of objects within a camera image are not as clear as edges of objects within a scanner image. Therefore, the difference in intensity between portions of a camera image may be obscure. Third, camera images may be distorted by sensor noise such as optical blur and vignetting, which also reduce image quality. Because of the problems described above, barcode reading using camera images faces additional challenges over scanned images. Applications have been developed which incorporate complex methods aimed at overcoming some of the problems above. However, each application is typically rigid in its approach to addressing the problems above. Therefore, current applications are often limited in flexibility and may be relevant only to particular barcode types, or particular conditions.

Accordingly, it may be desirable to introduce an application for use with camera image based barcode reading, which is capable of overcoming the disadvantages described above. Furthermore, it may be desirable to introduce an application which overcomes the disadvantages above in a flexible manner which enables utilization of the application under a variety of conditions and for different types of barcodes.

BRIEF SUMMARY

A method, apparatus and computer program product are therefore provided for providing a camera barcode reader having automatic localization, detection of orientation, and type classification.

In one exemplary embodiment, a method of providing a camera barcode reader is provided. The method includes processing an input image for an attempt to decode the input image using a current barcode reading method, determining whether the processing of the input image is successful, switching to one of a different barcode reading method or processing a new frame of the input image using the current barcode reading method in response to the processing of the input image being unsuccessful, attempting a decode of the input image using the current barcode reading method in response to the processing of the input image being successful, and performing a switch to the different barcode reading method in response to a failure of the attempt to decode the input image using the current barcode reading method.

In another exemplary embodiment, a computer program product for providing a camera barcode reader is provided. The computer program product includes at least one computer-readable storage medium having computer-readable program code portions stored therein. The computer-readable program code portions include first, second, third, fourth and fifth executable portions. The first executable portion is for processing an input image for an attempt to decode the input image using a current barcode reading method. The second executable portion is for determining whether the processing of the input image is successful. The third executable portion is for switching to one of a different barcode reading method or processing a new frame of the input image using the current barcode reading method in response to the processing of the input image being unsuccessful. The fourth executable portion is for attempting a decode of the input image using the current barcode reading method in response to the processing of the input image being successful. The fifth executable portion is for performing a switch to the different barcode reading method in response to a failure of the attempt to decode the input image using the current barcode reading method.

In another exemplary embodiment, an apparatus for providing a camera barcode reader is provided. The apparatus includes a processing element configured to process an input image for an attempt to decode the input image using a current barcode reading method, to determine whether the processing of the input image is successful, to switch to one of a different barcode reading method or processing a new frame of the input image using the current barcode reading method in response to the processing of the input image being unsuccessful, to attempt a decode of the input image using the current barcode reading method in response to the processing of the input image being successful, and to perform a switch to the different barcode reading method in response to a failure of the attempt to decode the input image using the first barcode reading method.

In another exemplary embodiment, an apparatus for providing a camera barcode reader is provided. The apparatus includes means for processing an input image for an attempt to decode the input image using a current barcode reading method, means for determining whether the processing of the input image is successful, means for switching to one of a different barcode reading method or processing a new frame of the input image using the current barcode reading method in response to the processing of the input image being unsuccessful, means for attempting a decode of the input image using the current barcode reading method in response to the processing of the input image being successful, and means for performing a switch to the different barcode reading method in response to a failure of the attempt to decode the input image using the current barcode reading method.

Embodiments of the invention may provide a method, apparatus and computer program product for providing a camera barcode reader, which may be advantageously employed in mobile environments such as mobile telephones or other mobile terminals. However, embodiments of the invention may also be employed in other devices which are fixed or mobile.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
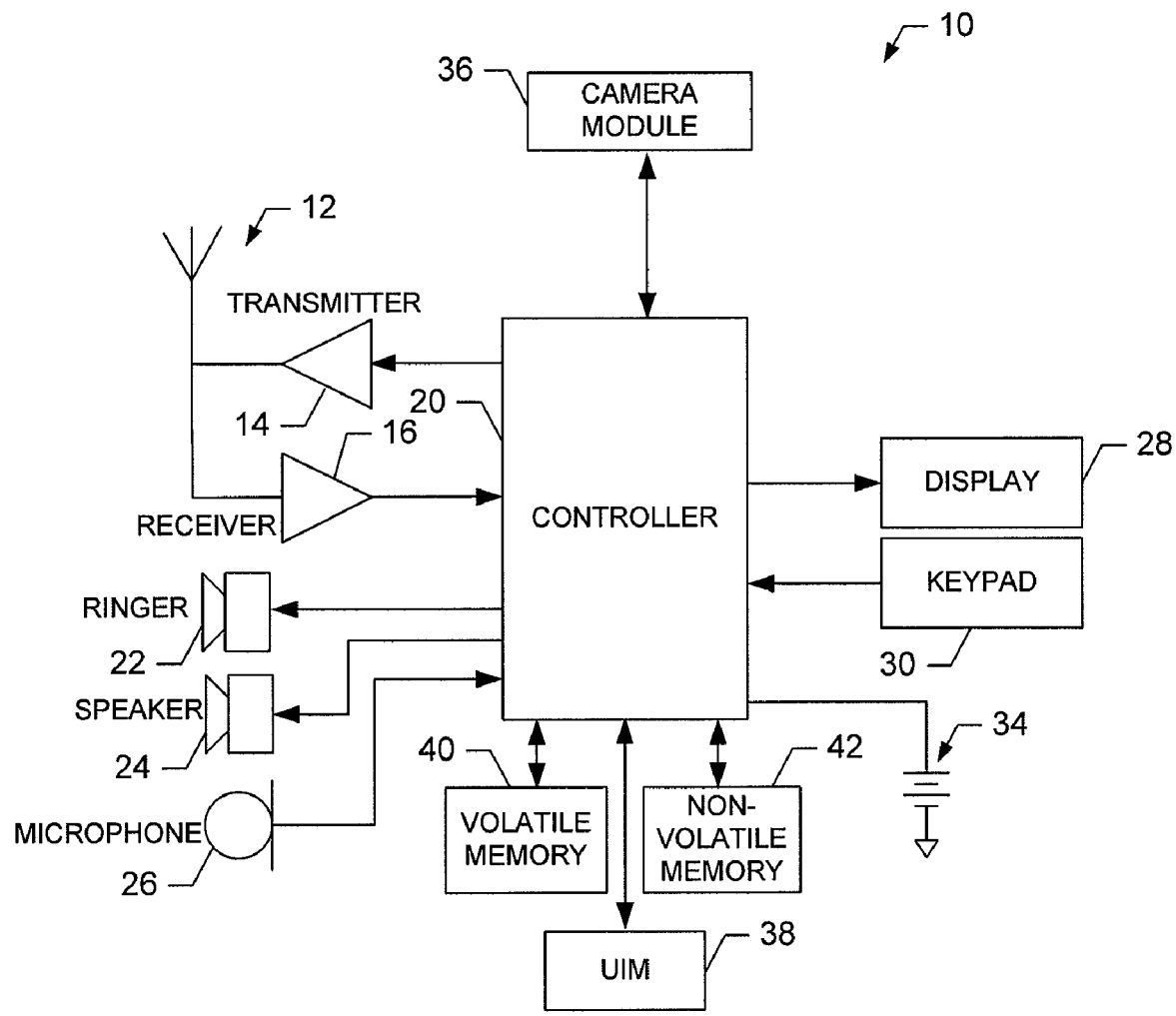
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a media capturing module 36, such as a camera, video and/or audio module, in communication with the controller 20. The media capturing module 36 may be any means for capturing an image, video and/or audio for storage, display or transmission. For example, in an exemplary embodiment in which the media capturing module 36 is a camera module, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
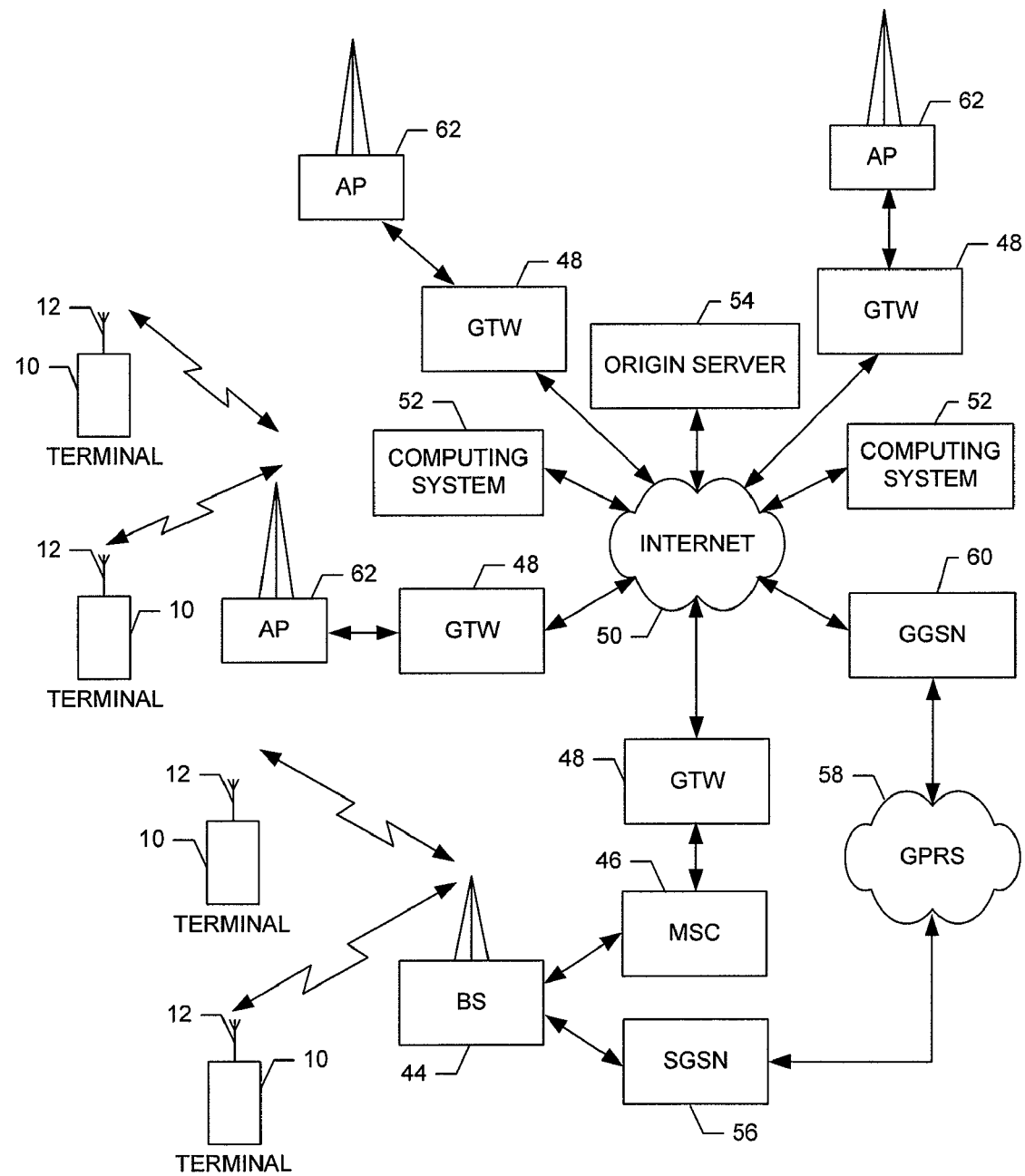
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, in which certain elements of a system for providing a camera barcode reader are displayed. The system of FIG. 3 may be employed, for example, on the mobile terminal 10 of FIG. 1. However, it should be noted that the system of FIG. 3 may also be employed on a variety of other devices, both mobile and fixed, and therefore, the present invention should not be limited to application on devices such as the mobile terminal 10 of FIG. 1 although an exemplary embodiment of the invention will be described in greater detail below in the context of application in a mobile terminal. Such description below is given by way of example and not of limitation. For example, the system of FIG. 3 may be employed on a camera, a video recorder, etc. Furthermore, the system of FIG. 3 may be employed on a device, component, element or module of the mobile terminal 10. It should also be noted that while FIG. 3 illustrates one example of a configuration of the system, numerous other configurations may also be used to implement embodiments of the present invention.

Figure 3:
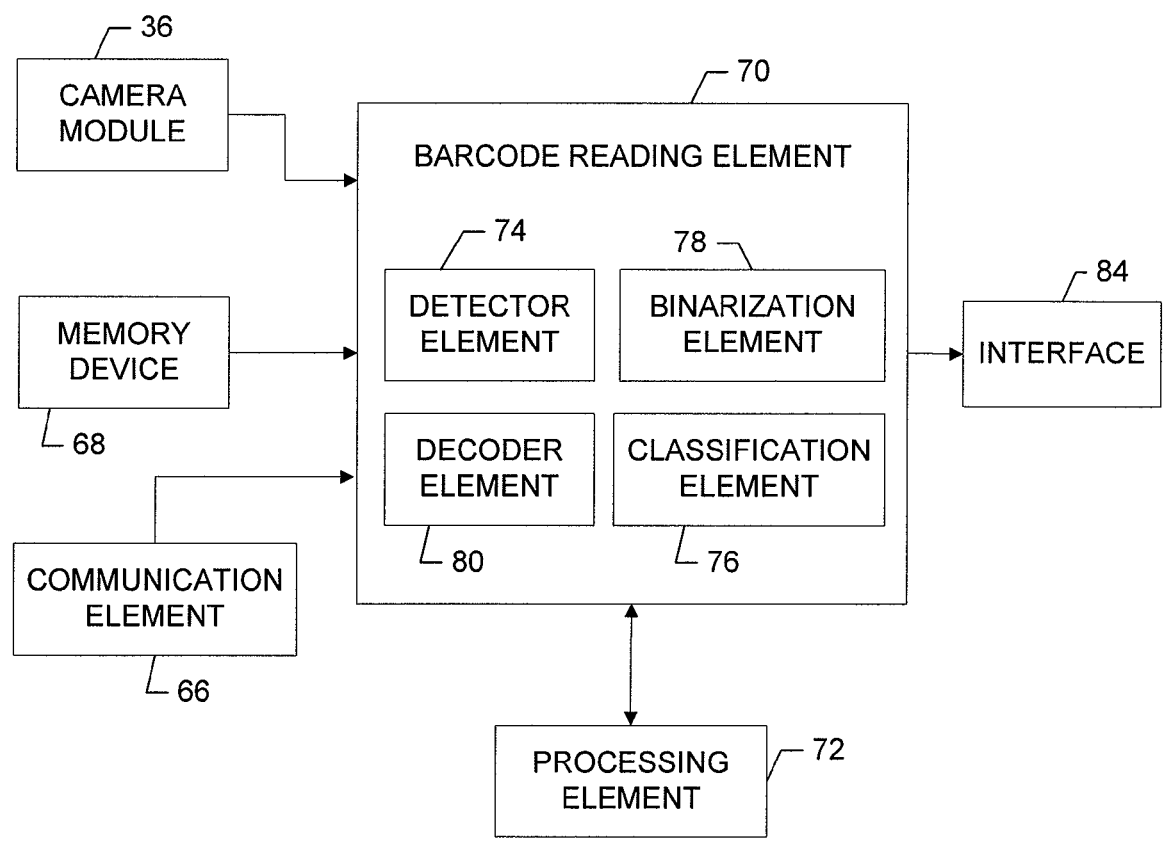
FIG. 3 illustrates a block diagram of portions of a system for providing a camera barcode reader according to an exemplary embodiment of the present invention.

Referring now to FIG. 3, a system for providing a camera barcode reader may include any number of image data sources such as, for example, the camera module 36, a communication element 66 and a memory device 68, any or all of which may be in communication with a barcode reading element 70 that operates under the control of a processing element 72. As such, the barcode reading element 70 according to embodiments of the present invention may alternatively be embodied as any device or means embodied in either hardware, software, or a combination of hardware and software that is capable of detecting, classifying and decoding a barcode as described in greater detail below. In this regard, the barcode reading element 70 may be disposed within an image processing chain such that, for example, images captured at the camera module 36 are automatically processed at the barcode reading element 70 as a part of the normal image processing chain. Alternatively, the barcode reading element 70 may be selectively employed either automatically based on image content or context information or upon user selection. In various exemplary embodiments, the barcode reading element 70 may be an element that is attachable/detachable with respect to a host device or the barcode reading element 70 may be loadable onto the host device. Thus, according to different exemplary embodiments, the barcode reading element 70 may process image data that is received directly from a sensor such as the camera module 36, the barcode reading element 70 may process image data that is retrieved from storage device such as the memory 68, the barcode reading element 70 may process image data that is received from the communication element 66 such as via a file transfer from another device, or the barcode reading element 70 may process image data from any combination of the above recited sources. As such, image data that is processed by the barcode reading element 70 could be, for example, Bayer matrix data, color image data, grey level image data, digitized or binary image data. The barcode reading element 70 could also be embodied as software that is downloadable, for example, by the mobile terminal 10 either via a wired or wireless connection.

The barcode reading element 70 according to an exemplary embodiment includes a detection element 74, a classification element 76, a binarization element 78 and a decoder element 80 all of which are capable of communication with each other as necessary to perform their respective functions. In an exemplary embodiment, each of the detection element 74, the classification element 76, the binarization element 78 and the decoder element 80 may be embodied as software that is capable of performing the functions associated with each respective element as described below and which operate under the control of the processing element 72, which may be, for example, the controller 20 of the mobile terminal 10 of FIG. 1. The processing element 72 may be embodied in many ways. For example, the processing element 72 may be embodied as a processor, a coprocessor, a controller or various other processing means or devices including integrated circuits such as, for example, an ASIC (application specific integrated circuit).

In general terms, the processing element 72 directs operation of other system elements in order to execute data processing and ultimately barcode reading. The detection element 74 detects a region of interest (ROI) within image data corresponding to a captured image. The classification element 76 classifies the ROI as being associated with either a one dimensional (1D) barcode or a two dimensional (2D) barcode. In an exemplary embodiment, the classification element 76 may be further capable of determining a particular type of 1D or 2D barcode based on geometric characteristics of specific barcode types as compared to patterns recognized within a particular image. The binarization element 78 is capable of binarizing an input image using one of two binarization methods described in greater detail below. The decoder element 80 is capable of decoding a barcode. In an exemplary embodiment, the decoder element 80 is capable of decoding several types of barcodes (e.g., different types of both 1D and 2D barcodes). It should be understood that the ROI may define an area in which a barcode is expected. In other words, the ROI may define a portion of an image that is closer to the center of the image with many image changes and surrounded by a quiet zone.

During an initialization stage, an input image from a particular source is received at the barcode reading element 70. The input image could be, for example, Bayer matrix data, an EXIF output, a color image from an imaging chain, a color image directly from a sensor, a saved image such as, for example, a JPEG image. For example, if Bayer matrix data is received, four components (one Red, one Blue and two Green) may be converted into a grey level image to provide a single value corresponding to each group of four input components. As such, the grey level may be computed as (R+2G+B)/4. It should be noted that it is also possible to compute a single value corresponding to each group based upon less than all of the four components or even a single component in order to reduce calculational complexity and increase processing speed.

As stated above, the detection element 74 detects an ROI within image data corresponding to a captured image. If the image data is binarized image data, the ROI could then be a binary ROI. The ROI may be considered a sub-image or portion of the captured image that is likely to contain a barcode. In an exemplary embodiment, it may be assumed that the ROI is likely to overlap or at least be proximately located with respect to the center of the captured image. Accordingly, the ROI may be determined by selecting a central image area that contains a large number of edges. For example, a common 1D barcode may include a series of alternating black and white lines of varying widths which are arranged to fit within a four sided polygon shape such as a rectangle or square shape. The four sided polygon is typically surrounded by a white area known as a quiet zone, which is provided with the intension of ensuring that the barcode can be differentiated from surrounding text or other objects which may include additional barcodes. Accordingly, if one were to assume that the barcode overlapped the center of the captured image and then one proceeded to measure gradient values extending from the center in all directions, one would expect that a large change in values may be detected at the edge of each of the alternating black lines. Thus, where a large number of edges can be detected corresponding to an area near the center of the captured image, it is likely that the barcode has been detected. The quiet zone can similarly be detected using, for example, a gradient edge detector which defines a four sided polygon that is likely to contain the barcode.

An exemplary gradient edge detector could be implemented using a Prewitt operator. For example, a 3×3 Prewitt operator may be given by:

$$\nabla_x = \begin{bmatrix} -1 & 0 & 1 \\ -1 & 0 & 1 \\ -1 & 0 & 1 \end{bmatrix}, \nabla_y = \begin{bmatrix} -1 & -1 & -1 \\ 0 & 0 & 0 \\ 1 & 1 & 1 \end{bmatrix},$$

while a 4×4 Prewitt operator is given by $$\nabla_x = \begin{bmatrix} -3 & -1 & 1 & 3 \\ -3 & -1 & 1 & 3 \\ -3 & -1 & 1 & 3 \\ -3 & -1 & 1 & 3 \end{bmatrix}, \nabla_y = \begin{bmatrix} -3 & -3 & -3 & -3 \\ -1 & -1 & -1 & -1 \\ 1 & 1 & 1 & 1 \\ 3 & 3 & 3 & 3 \end{bmatrix}.$$

According to an exemplary embodiment a modified 4×4 Prewitt operator may be employed, for example, such as the following operator:

$$\nabla_x = \begin{bmatrix} -1 & 0 & 0 & 1 \\ -1 & 0 & 0 & 1 \\ -1 & 0 & 0 & 1 \\ -1 & 0 & 0 & 1 \end{bmatrix}, \nabla_y = \begin{bmatrix} -1 & -1 & -1 & -1 \\ 0 & 0 & 0 & 0 \\ 0 & 0 & 0 & 0 \\ 1 & 1 & 1 & 1 \end{bmatrix}.$$

Notably, changing the standard operator according to the modified Prewitt operator expressed above results in an increase in speed of edge detection and a reduction of noise. Such an operator may be useful in edge detection for ROI determination which is conducted over an entire image since larger amounts of image data are analyzed to determine the ROI. If, however, a portion of the image can be selected either manually or automatically prior to ROI determination, the standard Prewitt operator or some other more time consuming operator may be employed. Although accuracy in edge detection may be reduced by edge detection using the modified Prewitt operator above, corrections may be implemented to improve accuracy while still enjoying the resultant speed increase associated with utilizing the modified Prewitt operator.

In this regard, corrections may be iteratively performed when edge detection performed utilizing a high speed, reduced accuracy operator such as the modified Prewitt operator is to be used to produce a decodable barcode. For example, if the modified Prewitt operator is to be utilized and the resultant edge detection produces an ROI, a correction may be performed to the ROI in order to modify the ROI prior to the attempt to decode the barcode. The corrections will be described in greater detail below. However, since the corrections are performed only on the previously detected ROI and not on the entire captured image, time savings are typically noticeable during operation.

Utilizing a gradient edge detector such as, for example, the modified Prewitt operator, the absolute value of the output of the gradient edge detector may be used to fill two buffers including a horizontal histogram buffer and a vertical histogram buffer. Buffer size may be determined by input image size. Further processing is only performed on data stored in the buffers and thus speed is further increased, while storage requirements for temporary image data are minimized. The ROI, and corresponding barcode, is detected from the two buffers and thus, since only the barcode closest to the center of the input image will be identified in association with the ROI and be processed, an image containing multiple barcodes will not slow down the barcode reading element 70.

After completion of the steps above, the horizontal and vertical histograms are processed as follows. First, a maximum histogram value $h_{max}$ in the central area, and a corresponding maximum index $i_{hmax}$ are detected. A minimum histogram value is then computed in a specific direction (i.e. left or right for horizontal histograms and up or down for vertical histograms) from the detected maximum value. For example, for histogram indexes between 0 and $i_{hmax}$, a minimum value of the horizontal histogram to the left of the detected maximum could be expressed as $h_{min1}$. Accordingly a left threshold may be determined as $$thr_l = \frac{h_{max} + 7h_{min1}}{8} + 1.$$

Meanwhile, a right threshold may be determined as $$thr_r = \frac{h_{max} + 7h_{minr}}{8} + 1.$$

Upper and lower thresholds could be calculated in similar fashion. After the thresholds have been determined for each of the specific directions, histogram values are compared to the threshold on a value by value basis extending in each corresponding specific direction until a selected number of consecutive values below the threshold are encountered. When the selected number of corresponding values below the threshold is encountered, any one of the selected number of corresponding values which were determined to be below the threshold may be defined as the border or edge of the ROI. For example, if the selected number of consecutive values is three, the horizontal histogram may be examined by moving in the left and right directions from the maximum histogram value and comparing the histogram values to the left and right thresholds, respectively. The left border of the ROI may be defined as the first of three consecutive histogram values encountered while moving to the left of the maximum histogram value which are each below the left threshold. Meanwhile, the right border of the ROI may be defined as the first of three consecutive histogram values encountered while moving to the right of the maximum histogram value which are each below the right threshold. When the process above has been completed in both the horizontal and vertical directions, the ROI is defined. Essentially, the process above attempts to identify when the quiet zone is encountered while moving out from near the center of the ROI.

If the image data is binary data, ROI detection is performed in a similar manner to that described above, except that an orientation of edges, which may be quantized, for example, on eleven levels for each direction, may be computed. The orientation is considered to be zero if no edge is detected in a four pixel neighborhood. For example, a 4×4 processing window or operator may be employed. If image size is bigger than an arbitrarily selected value such as, for example, 300 pixels, then a downsampling may be performed. For example, if a downsampling by a factor of four is to be performed, every fourth pixel may be processed in each of the directions while moving from the maximum value in order to detect edges. In each window, edge orientation, denoted by $E_0$ may be computed. An exemplary processing window may be defined as follows:

$$\begin{bmatrix} B_0 & B_1 & B_2 & B_3 \\ B_4 & X & X & B_5 \\ B_6 & X & X & B_7 \\ B_8 & B_9 & B_{10} & B_{11} \end{bmatrix},$$

where it should be noted that only twelve of sixteen bits within the window are used. In other words, bits represented by "X" values are ignored, while binary values of $B_0$-$B_{11}$ are of interest. Computation of $E_0$ is performed by executing the following operations. Compute L1=($B_4$ XNOR $B_6$) XOR ($B_5$ XNOR $B_7$), where XNOR and XOR are the negate exclusive OR, and exclusive OR logical operations, respectively. Compute L2=($B_1$ XNOR $B_2$) XOR ($B_9$ XNOR $B_{10}$). If L1 is TRUE and L2 is FALSE, then compute n1=$B_0$+$B_1$+$B_2$+$B_3$ and n2=$B_8$+$B_9$+$B_{10}$+$B_{11}$. If both n1 and n2 are equal to 0 or 4, then $E_0$=0, otherwise $E_0$=$(-1)^{B4}$(n1−n2)−5. If L1 is FALSE and L2 is TRUE, then compute n1=$B_0$+$B_4$+$B_6$+$B_8$ and n2=$B_3$+$B_5$+$B_7$+$B_{11}$. If both n1 and n2 are equal to 0 or 4, then $E_0$=0, otherwise $E_0$=$(-1)^{B4}$(n1−n2)+5. If L1 is TRUE and L2 is TRUE, then $E_0$=$(-1)^{B4}$10, otherwise $E_0$=0.

Histograms of edge orientation are then computed in vertical and horizontal dimensions of the image. The binary ROI is then selected as an area having a large number of edges near the center of the image using the steps described above with respect to calculating thresholds corresponding to each dimension and moving from the maximum value in each of the dimensions until a selected number of pixel values are below the corresponding threshold for the dimension.

Whether or not the ROI is binary, the ROI will be defined as having a particular value or length in each dimension (i.e., using the histograms of edge orientation in vertical and horizontal dimensions). The classification element 76 is configured to compare the dimensions of the ROI to classify the barcode as being either 1D or 2D based on the comparison of the dimensions. In an exemplary embodiment, if the comparison of the maximum values of the horizontal and vertical histograms reveals that each of the dimensions is substantially of different values, then the barcode may be classified as being 1D. For example, if one dimension of the ROI is sixteen times smaller than the other dimension, the barcode may be classified as being 1D, while if the ratio between dimensions is less than sixteen-to-one, the barcode may be classified as being 2D. In other words, the classification element 76 is configured to classify a barcode as being 1D or 2D based on a relationship of relative sizes of the dimensions of the ROI as compared to a particular threshold which is predictive of a statistical likelihood that the ROI is representative of either a 1D or a 2D barcode. If the ROI is a binary ROI, then the orientation histogram of a detected object may be computed. If the orientation histogram has an isolated peak (e.g., just one peak for both the horizontal and vertical histograms), then the detected object is considered a 1D barcode. In this regard, as stated above, if maximum values for the orientation histograms in each direction differ by an amount greater than a particular threshold which is predictive of a statistical likelihood that the ROI is representative of either a 1D or a 2D barcode, then the binary ROI is considered to represent a 1D barcode. In other words, the classification element 76 may differentiate between a 1D barcode and a 2D barcode based on a relationship between a first length of an object oriented in a first direction and a second length of an object oriented in a second direction that is substantially perpendicular to the first direction.

The classification element 76 may further include a capability of determining 1D and 2D barcode types. In this regard, the classification element 76 may be configured to extract geometric characteristics from an ROI and compare the extracted characteristics to specifications of 2D barcodes which the decoder element 80 is capable of decoding. Accordingly, the classification element 76 may examine specific component patterns which may be indicative of the type of barcode disposed within the ROI. For example, an Aztec barcode has two concentric rectangles near the center of the barcode, QRcode includes three corners having two concentric rectangles with an interior rectangle being filled, a DataMatrix barcode may have an L shape, etc. With respect to 1D barcodes, the classification element may examine the number of edges of the barcode in order to determine the type of 1D barcode. In an exemplary embodiment, the classification element 76 may communicate the type of 1D or 2D barcode to a user via an interface 84, which could be, for example, a display.

The classification element 76 is capable of determining 1D and 2D processing types even when scanning lines or objects within the barcode are at an angle of inclination. In this regard, the larger dimension of the ROI or the isolated orientation peak of binarized data will be indicative of scanning line positions. For example, if the larger dimension of the ROI is horizontal, then the scanning lines are horizontal. The scanning lines may then be examined and the number and thicknesses of bars will indicate the type of 1D barcode. The decoder element 80 may also use the information regarding the number and thicknesses of bars to decode the barcode.

The binarization element 78 may be operated at any of various times within the processing of a barcode. For example, input image data could be binarized after acquisition of the input image, or an ROI could be calculated from the input image as described above and then the ROI could be binarized. In any case, binarization may be accomplished according to one of two different methods including global binarization and adaptive binarization. A method for providing a camera barcode reader according to an exemplary embodiment may provide for an initial use of the global binarization and, if the barcode reader element 70 is unable to decode the barcode, the adaptive binarization may be employed as described in greater detail below. In other words, the barcode reader element 70 may switch between binarization methods on successive detection attempts in the event that successive attempts are necessary.

The global binarization uses maximum and minimum values detected from either the input image (if binarization is done before ROI detection) or from the ROI in order to calculate an average value, which is used as a threshold for binarizing the input image or ROI. In other words, if a particular value (e.g., a grey scale value) is above the threshold, the particular value will be set to 1, while if the particular value is below the threshold, the particular value will be set to 0. Global binarization is relatively fast as compared to adaptive binarization, and thus global binarization may be utilized initially in an attempt to minimize processing time. However, if the detection and decoding attempt fails to produce a result, adaptive binarization may be employed in a subsequent attempt. An example of a situation which may cause global binarization to fail could be the existence of a shadow across the barcode such as a shadow of the mobile terminal used to capture the input image.

The adaptive binarization first divides the input image or ROI into multiple portions such as two equal halves and then completes the processing described below on each of the halves or semi-images created by the division. A central recursive implementation of moving averages is utilized to provide the binarization. For example, if the division to create the semi-images is performed along a particular column, then processing of each semi-image may be performed on lines independently, starting with a local parameter that is previously initialized. The following equation describes an implementation of adaptive binarization according to an exemplary embodiment: $M_{i+1} = M_i + p_{i+a} - p_{1-b}$, where $M_{i+1}$ represents a moving sum from an initial local parameter $M_i$, p represents a pixel value (e.g. grey scale value) and a and b represent a selected number of pixels. Local influence over a threshold value may be increased by averaging a current value with a value computed at a previous step. For example, if the value computed is H, a line above the current line may be used to update H. An exemplary adaptive binarization method may have an adaptive threshold Ti give by $$T_i = \frac{1}{n}(H \cdot AP(H) + GP),$$

where n is window size used, GP=0.1*(Max+Min) is a global parameter factor which depends upon maximum and minimum values within the ROI or input image, and AP is an adaptive parameter function that is a window function defined by global parameters Min+GP and Max+GP. The adaptive binarization is described in greater detail in U.S. patent application Ser. No. 11/194,124, to A. Burian and M. Vehvilainen entitled "Binarization of an Image", which was filed on Jul. 29, 2005 and is incorporated herein by reference in its entirety.

The decoder element 80 performs additional processing and decoding operations upon the barcode in an effort to ultimately decode the barcode. As stated above, the decoder element 80 utilizes information regarding the number and thicknesses of bars to decode a 1D barcode, and special shapes or structures for decoding 2D barcodes. The decoder element 80 includes correction mechanisms which will be described in greater detail below. The decoder element 80 is also configured to determine an encoded message associated with the barcode by examining bit patterns associated with 2D barcodes. The bit patterns result from computation of a scanning mesh which is performed as follows. Based on the specification of the detected 2D barcode type, a true size of the scanned barcode is determined by computing sizes of objects within the ROI (which is typically a rectangular ROI), and knowing possible sizes of objects for the corresponding specification. A size from the specification which is relatively close to the computed size is chosen. For example, the computed size may be determined by computing minimum distances between opposite segments of the rectangular ROI containing the barcode. Since possible sizes of the barcode are known from the specification, maximum and minimum cell sizes may be computed in horizontal and vertical directions (or in directions other than horizontal and vertical). Actual sizes of within the scanned barcode are then computed and the minimum obtained size is selected from the possible sizes using the detected barcode type specifications.

As stated above, the decoder element 80 may also be capable of performing correction mechanisms. In this regard, the decoder element 80 may be capable of correcting the ROI. In an exemplary embodiment, a binary recursive median filter may be employed to remove noise impulses from the ROI. The ROI may then be corrected by adjusting corner positions of the ROI. In this regard, the corrections of the corner positions are accomplished by moving the corner positions within their corresponding local neighborhoods such that a new ROI containing the whole barcode (including any optically deformed areas) is formed. An image warping processing may also be performed. Correction of the ROI may be useful if corner positions of the current ROI are not the actual corners of the barcode. For example, the corner positions of the current ROI could be within a text region that is adjacent to the barcode or within the barcode itself.

Figure 4:
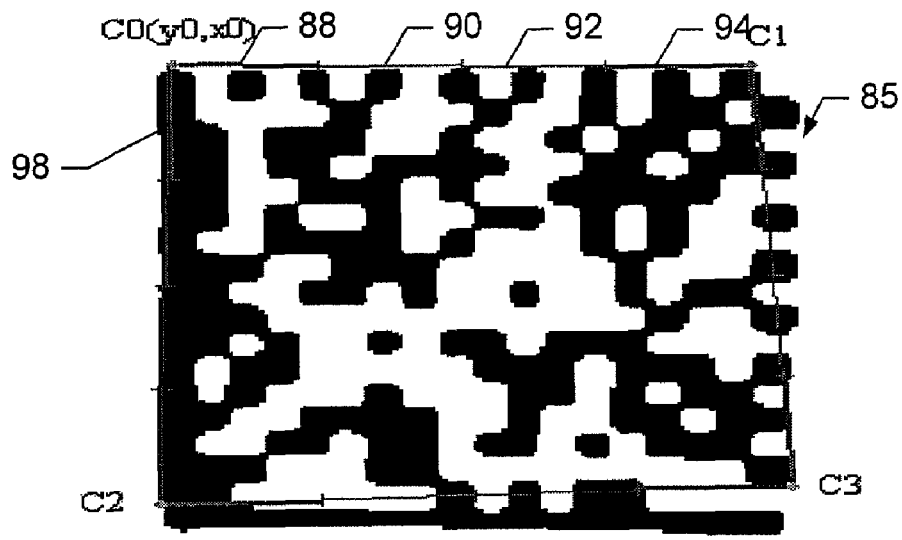
FIG. 4 illustrates a barcode and associated region of interest in need of correction according to an exemplary embodiment of the present invention.

In an exemplary embodiment, corner position correction may be accomplished by dividing each border of the ROI into four sub-segments. For example, if it is assumed that a particular ROI has four borders and includes a barcode 85, as shown in FIG. 4, then each of the borders is defined as a segment connecting adjacent corners. Each of the four borders may then be divided into four sub-segments. Sub-segments which intersect at the corners may then be shifted based upon a degree of overlap with the barcode 85. Thus, for example, a first border connecting corner C0 to corner C1 may be divided into a first sub-segment 88 which originates at corner C0, a second sub-segment 90 which extends from an end of the first sub-segment 88 toward corner C1, a third sub-segment 92 which extends from an end of the third sub-segment 92 toward corner C1 and a fourth sub-segment 94 which extends from an end of the third sub-segment 92 to the corner C1. A second border may also include four segments and extend from corner C0 to corner C2. The second border may include a fifth sub-segment 98 which may originate at corner C0 and extends toward corner C1. Distances between the sub-segments and the barcode 85 in each direction (i.e., horizontal (e.g., left and right) and vertical (e.g., up and down)) may then be used to define four points at the intersection of corresponding minimum distances with the respective sub-segments. Distance from the barcode 85 to the sub-segments may be determined based on a degree of overlap. In this regard, correction of corner C0 may then be performed by determining a degree of overlap between the barcode 85 and both the first and fifth sub-segments 88 and 98. For example, a number of black pixels which overlap each of the sub-segments may be determined in order to make a determination as to whether and in which direction each of the sub-segments must be moved.

Accordingly, in an exemplary embodiment as shown in FIG. 4, if the number of black pixels intersecting the first sub-segment 88 is zero, then the first sub-segment 88 is likely too far from the bar code and should be moved in a direction toward the barcode or toward the center (down in this instance). The number of black pixels intersecting the first sub-segment 88 is then recalculated and the first sub-segment is moved accordingly until the number of black pixels intersecting the first sub-segment 88 is 1 or 2. If the number of black pixels intersecting the first sub-segment 88 is greater than 3, then the first sub-segment 88 is moved away from the barcode 85 (up in this instance). The process above may be iteratively performed until the corresponding sub-segments has the desired overlap with the barcode 85, which is stated as 1 or 2 pixels in this example, but should be understood to be any desired value. Alternatively, the process above may be iteratively performed until a selected number of iterations is reached such as, for example, two or three. The fifth sub-segment 98 undergoes the same process described above while maintaining the intersection between the first and fifth sub-segments 88 and 98. In this regard, the movement of the sub-segments may be performed simultaneously or in series, however, in either case, the intersection between the first and fifth sub-segments 88 and 98 is maintained throughout the process. Thus, according to the example of FIG. 4, the first sub-segment 88 is iteratively moved down (i.e., toward the barcode 85) until 1 or 2 black pixels overlap the first sub-segment 88 and the fifth sub-segment 98 is moved left (i.e., away from the barcode 85) until 1 or 2 black pixels overlap the fifth sub-segment 98. Accordingly the corner C0 is corrected.

Figure 5:
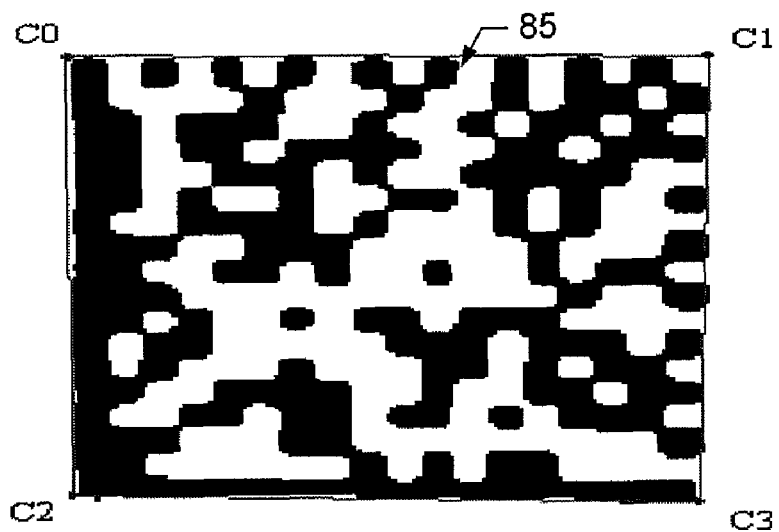
FIG. 5 illustrates the barcode of FIG. 4 in which the region of interest has been corrected according to an exemplary embodiment of the present invention.

After correction of each of the corners, geometrical corrections may also be performed for new borders of the newly defined ROI based on the corrected corners. In this regard, according to an exemplary embodiment, each border may be divided into eight sub-segments (or any other desired number) and distances from the sub-segments to the barcode 85 may be calculated. For example, the degree of overlap calculations described above may be employed. Accordingly, the sub-segments may be utilized to further correct the ROI. FIG. 5 illustrates a new ROI defined by borders formed by line segments connecting each of the corners C0, C1, C2 and C3 after the correction process described above is completed for each of the corners and corresponding borders. A morphological filter may then be applied to perform dilation and erosion in order to correct shapes of objects inside the barcode 85.

As stated above, embodiments of the present invention may be employed in numerous fixed and mobile devices. In this regard, embodiments of the present invention may be useful in enabling mobile terminals in performing barcode reading in relatively harsh environments. The dynamic nature of the processing capabilities of the barcode reading element 70 enable users of mobile terminals to quickly and accurately determine a type of barcode and the corresponding information encoded by the barcode. In this regard, the capabilities of the barcode reading element 70 enable dynamic switching between multiple detection and decoding methods which may each selectively employ aspects of the barcode reading element 70 which have been described above. Additionally, embodiments of the present invention provide a mechanism by which a relatively quick method may be employed to attempt to decode a barcode and, if the decode attempt is unsuccessful, embodiments of the present invention provide for automatic modification of the method, or dynamic switching between methods having different characteristics in order to provide robust decode capabilities in a time period that is variable based on the difficulty encountered in conducting decode operations.

Figure 6:
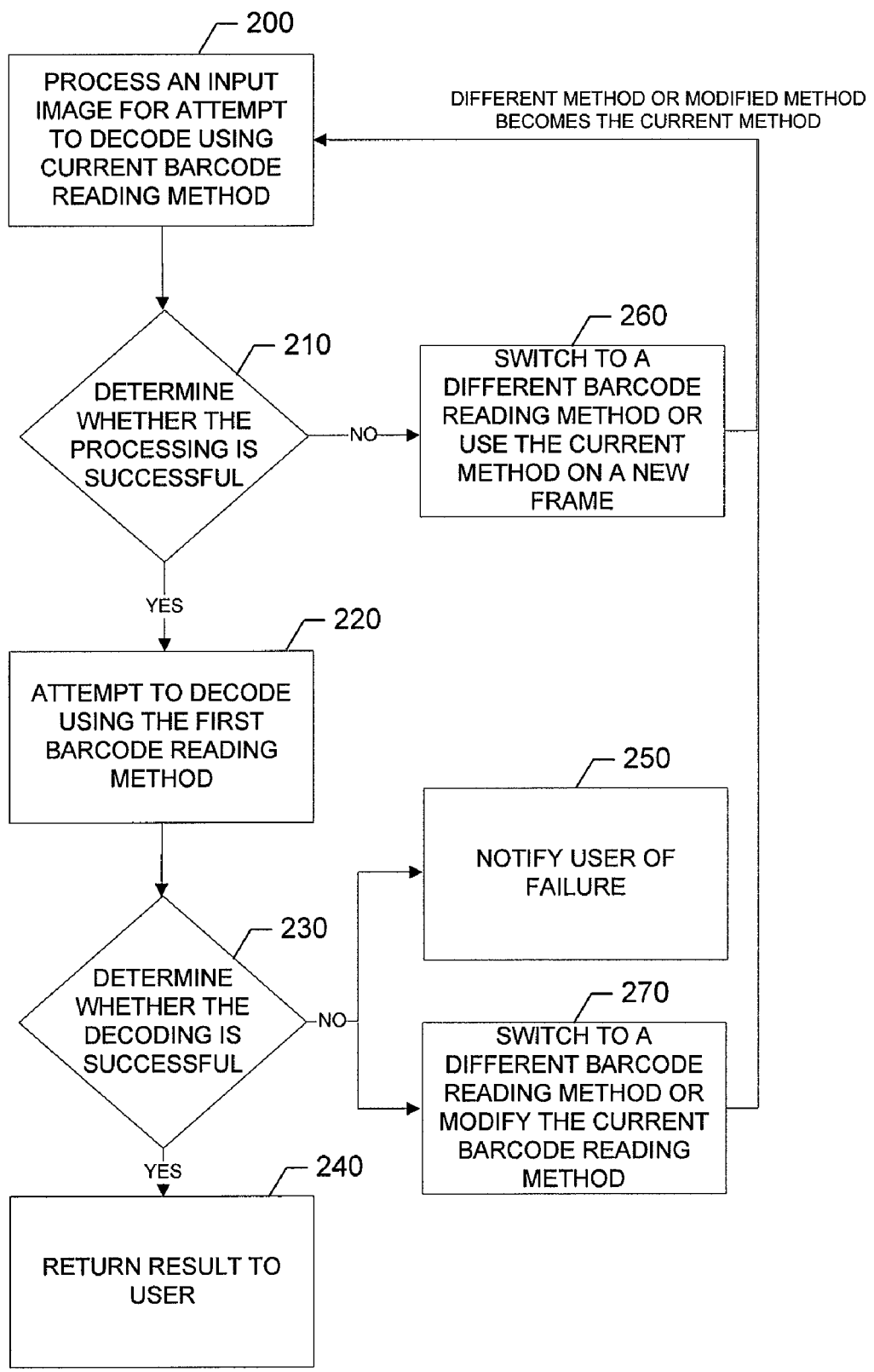
FIG. 6 is a flowchart according to an exemplary method of providing a camera barcode reader according to one embodiment of the present invention.
Figure 7:
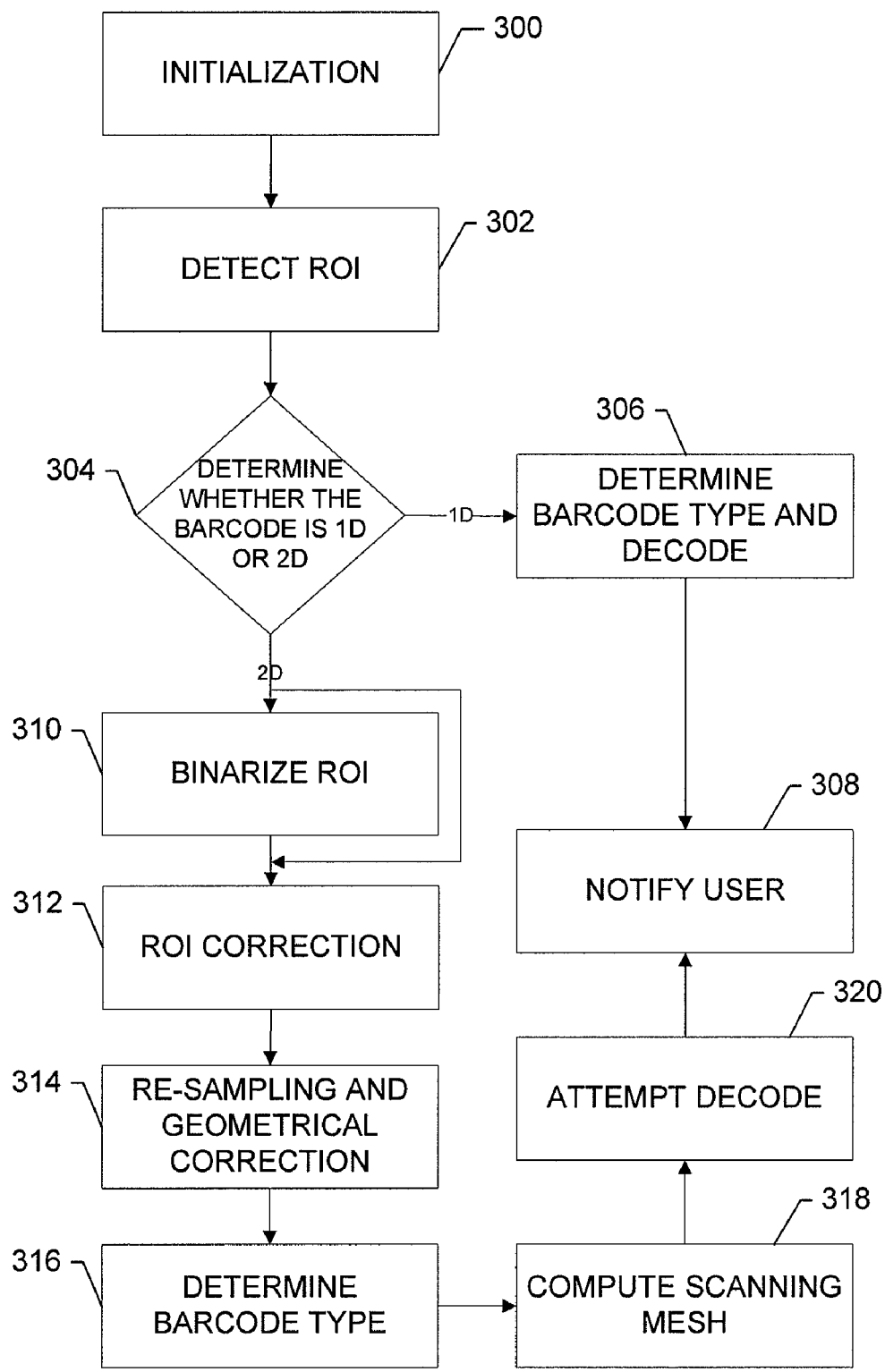
FIG. 7 is a flowchart showing a first method for use within the method of providing a camera barcode reader according to an exemplary embodiment of the present invention.
Figure 8:
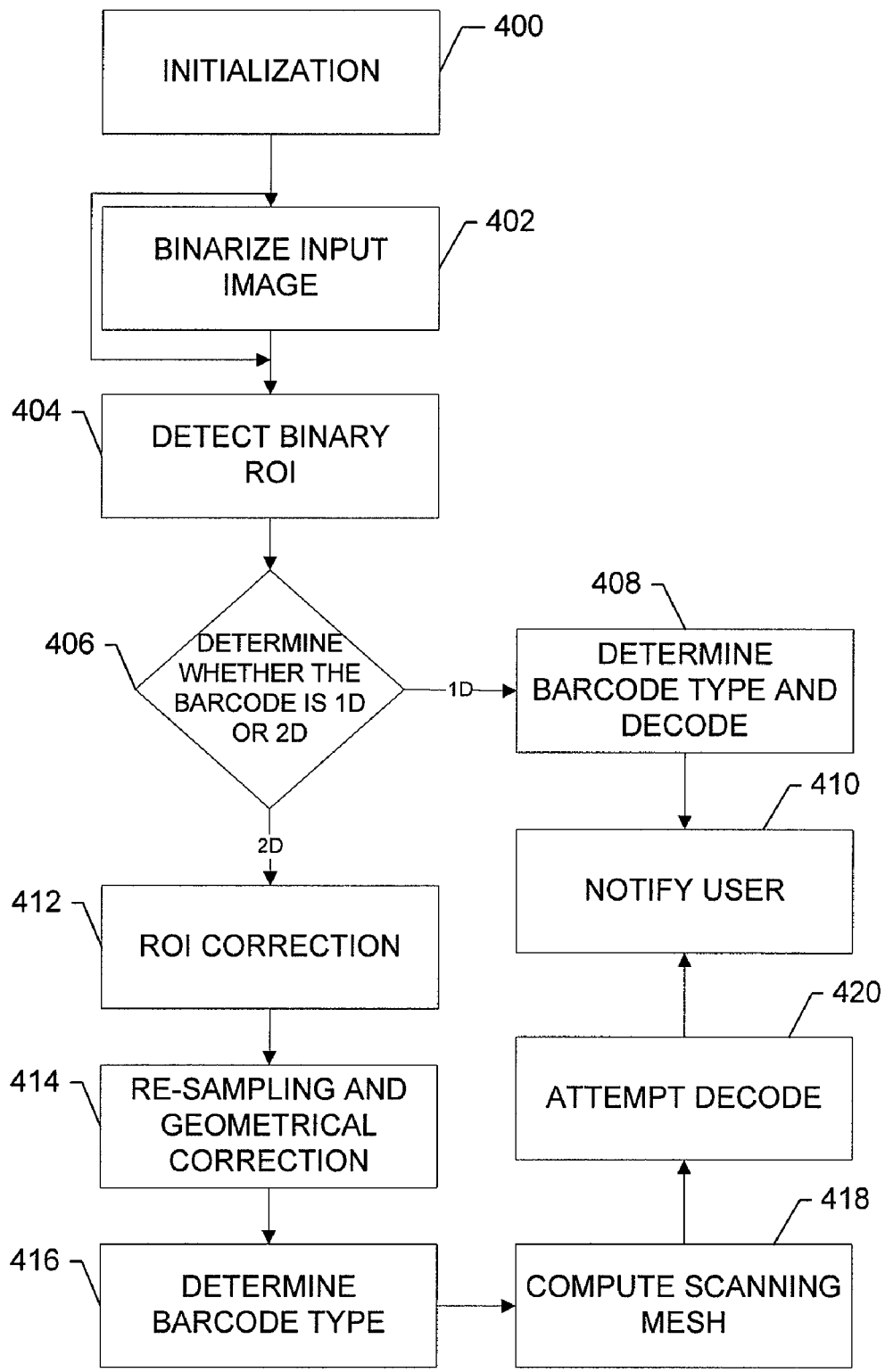
FIG. 8 is a flowchart showing a second method for use within the method of providing a camera barcode reader according to an exemplary embodiment of the present invention.

FIGS. 6-8 are flowcharts of a system, methods and program products according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing a camera barcode reader, as shown in FIG. 6, may include processing an input image for an attempt to decode the image using a first barcode reading method at operation 200. At operation 210, a determination is made as to whether the processing of the input image is successful. If the processing is unsuccessful, a switch is made to a second barcode reading method or a new frame of the input image is processed at operation 260. If the processing of operation 200 is successful, the first barcode reading method is utilized for attempting to decode the input image at operation 220. A determination is made at operation 230 as to whether the decode attempt of operation 220 is successful. If the decode attempt of operation 220 is successful, then the user is notified at operation 240. If the decode attempt is unsuccessful, then either the user may be notified of the failure at operation 250, the switch to the second barcode reading method may be performed, or parameters of the first barcode reading method may be modified and a reattempt at decoding may be performed at operation 270. If the switch has been made to the second barcode reading method, then the method described above is performed except that the terms first and second barcode reading method are swapped in operations 200 to 270. In other words, the first barcode reading method could simply be referred to as a current barcode reading method and either the modified first barcode reading method or the second barcode reading method could be referred to as a new or different barcode reading method.

FIG. 7 illustrates the first barcode reading method according to an exemplary embodiment. In this regard, the first barcode reading method includes an initialization at operation 300. During initialization, an input image is obtained. The input image may have been obtained by capture at an image sensor or camera, by receipt from a device in communication with a device employing the first barcode reading method, or by retrieval of a stored image. If the input image is a color image, a grey level image may be created. Meanwhile, if the input image is a grey level image or a binary input image, the input image may be directly communicated to the detection element for ROI detection. At operation 302, an ROI may be detected. Based on the characteristics of the ROI, a determination may be made at operation 304 as to whether a barcode in the ROI corresponds to a 1D barcode or a 2D barcode. At operation 306, if the barcode is a 1D barcode, the 1D barcode type is determined and the barcode is decoded. Operation 304 may determine a 1D barcode according to the processes described above with respect to the classification element 76. Alternatively, points of interest or objects within the ROI may be detected and, if all of the points of interest have substantially the same orientation, the barcode may be classified as a 1D barcode. Accordingly, at operation 306, line widths may be determined in order to decode the barcode. The user may be notified of the result of the attempt to decode at operation 308.

If at operation 304, the barcode is determined to be a 2D barcode, binarization may be performed at operation 310. In this regard, the binarization may be performed via either the global binarization or the adaptive binarization described above. It should be noted that the global binarization is the default binarization method and the adaptive binarization may be substituted in the event that the first barcode reading method is modified at operation 270. It should also be noted that, if the input image is binary, operation 310 may be skipped. At operation 312, ROI correction is performed. In other words, corner correction is performed. Re-sampling and geometrical correction is performed at operation 314. If either ROI correction or geometrical correction are not able to be completed, a switch may be made to the second method or, if available, a new frame may be utilized in order to restart the ROI correction at operation 310 using the same ROI. If operations 312 and 314 are successfully completed, then barcode type may be determined at operation 316. Based on the barcode type, a scanning mesh may be computed at operation 318. In this regard, mesh and resample operations may produce a bit pattern for the barcode which can be decoded. As stated above, mesh computation may begin by estimating barcode size based on known barcode characteristics for the identified barcode type. A decode attempt may be performed at operation 320 and the user may be notified of the result at operation 308.

FIG. 8 illustrates the second barcode reading method according to an exemplary embodiment. In this regard, the second barcode reading method includes an initialization of an input image at operation 400. The initialization may be similar to that described above for operation 300. At operation 402, the input image may be binarized as described above. It should be noted that the global binarization is the default binarization method and the adaptive binarization may be substituted in the event that the first barcode reading method is modified at operation 270. It should also be noted that, if the input image is already binarized, then operation 402 may be skipped. At operation 404, a binary ROI is detected as described above. A determination may be made at operation 406 as to whether a barcode in the binary ROI corresponds to a 1D barcode or a 2D barcode. At operation 408, if the barcode is a 1D barcode, the 1D barcode type is determined and the barcode is decoded. Operation 406 may determine a 1D barcode according to the processes described above with respect to the classification element 76. Accordingly, at operation 408, a decode attempt may be made for the 1D barcode. The user may be notified of the result of the attempt to decode at operation 410.

If at operation 406, the barcode is determined to be a 2D barcode, ROI correction may be performed at operation 412. Re-sampling and geometrical correction may be performed at operation 414. If either ROI correction or geometrical correction are not able to be completed, a switch may be made to the first method or, if available, a new frame may be utilized in order to restart the ROI correction at operation 412 using the same ROI. If operations 412 and 414 are successfully completed, then barcode type may be determined at operation 416. Based on the barcode type, a scanning mesh may be computed at operation 418. A decode attempt may be performed at operation 420 and the user may be notified of the result at operation 410.

It should be noted that with respect to the method for providing a camera barcode reader described above in FIG. 6, the first barcode reading method and the second barcode reading method are interchangeable. In other words, the term first barcode reading method could be utilized to refer to operations 400-420 of FIG. 8, while the term second barcode reading method could be utilized to refer to operations 300-320 of FIG. 7. Additionally, methods other than those exemplary methods disclosed in FIGS. 7 and 8 could be utilized as the first and second barcode reading methods of FIG. 6. However, regardless of which specific methods are utilized as the first and second barcode reading methods of FIG. 6, it should be understood that parameters calculated or utilized in connection with the performance of the first method may be transferred to the second method in the event that a switch between methods is performed. Additionally, each method provides a capability for sequential frame processing in which, as described above, a next sequential frame may be utilized in connection with the performance of a method if the current frame is not successful in providing a decode of the barcode. However, with regard to method switching, method modification, sequential frame processing, and ROI correction, each operation may have a corresponding time limit before the operation times out and fails. Alternatively, an entire decode attempt in accordance with the method of FIG. 6 may be performed subject to a time limit. As such, if the time limit expires, the decode attempt may immediately fail and the user may receive an indication that the decode attempt has failed due to elapsed time, or simply that the barcode reading element 70 is unable to decode the barcode.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
processing an input image for an attempt to decode the input image using a current barcode reading method, the processing including performing a correction on the input image;
determining whether the processing of the input image is successful based on a determination as to whether the correction is completed;
switching to one of a different barcode reading method or processing a new frame of the input image using the current barcode reading method in response to the processing of the input image being unsuccessful;
attempting a decode of the input image using the current barcode reading method in response to the processing of the input image being successful; and
performing a switch to the different barcode reading method in response to a failure of the attempt to decode the input image using the current barcode reading method.

2. A method according to claim 1, wherein processing the input image comprises determining a region of interest (ROI) defining an area in which a barcode is expected.

3. A method according to claim 2, wherein processing the input image further comprises performing the correction by correcting the ROI.

4. A method according to claim 3, wherein correcting the ROI comprises correcting corner positions of the ROI based on a degree of overlap between the barcode and segments of a border of the ROI which are adjacent to each respective corner.

5. A method according to claim 2, wherein processing the input image further comprises performing the correction by performing re-sampling and geometric image correction.

6. A method according to claim 2, wherein processing the input image comprises binarizing the ROI.

7. A method according to claim 6, wherein performing a switch to the different barcode reading method comprises modifying the current barcode reading method by switching from a global binarization to an adaptive binarization.

8. A method according to claim 1, further comprising performing a determination as to whether the input image includes one of a one dimensional (1D) barcode or a two dimensional (2D) barcode.

9. A method according to claim 8, further comprising determining a type of barcode.

10. A method according to claim 8, wherein the determination is performed based on a relationship between a first length of an object oriented in a first direction and a second length of the object oriented in a second direction that is substantially perpendicular to the first direction.

11. A method according to claim 1, wherein processing the input image comprises binarizing the input image.

12. A method according to claim 11, wherein performing a switch to the different barcode reading method comprises modifying the current barcode reading method by switching from a global binarization to an adaptive binarization.

13. A computer program product comprising at least one computer-readable storage medium having computer-readable program code portions stored therein, the computer-readable program code portions comprising:

a first executable portion for processing an input image for an attempt to decode the input image using a current barcode reading method, the processing including performing a correction on the input image;

a second executable portion for determining whether the processing of the input image is successful based on a determination as to whether the correction is completed;

a third executable portion for switching to one of a different barcode reading method or processing a new frame of the input image using the current barcode reading method in response to the processing of the input image being unsuccessful;

a fourth executable portion for attempting a decode of the input image using the current barcode reading method in response to the processing of the input image being successful; and a fifth executable portion for performing a switch to the different barcode reading method in response to a failure of the attempt to decode the input image using the current barcode reading method.

14. A computer program product according to claim 13, wherein the first executable portion includes instructions for determining a region of interest (ROI) defining an area in which a barcode is expected.

15. A computer program product according to claim 14, wherein the first executable portion includes instructions for performing the correction by correcting the ROI.

16. A computer program product according to claim 15, wherein the first executable portion includes instructions for correcting corner positions of the ROI based on a degree of overlap between the barcode and segments of a border of the ROI which are adjacent to each respective corner.

17. A computer program product according to claim 14, wherein the first executable portion includes instructions for performing the correction by performing re-sampling and geometric image correction.

18. A computer program product according to claim 14, wherein the first executable portion includes instructions for binarizing the ROI.

19. A computer program product according to claim 18, wherein the fifth executable portion includes instructions for modifying the current barcode reading method by switching from a global binarization to an adaptive binarization.

20. A computer program product according to claim 13, further comprising a sixth executable portion for performing a determination as to whether the input image includes one of a one dimensional (1D) barcode or a two dimensional (2D) barcode.

21. A computer program product according to claim 20, further comprising a seventh executable portion for determining a type of barcode.

22. A computer program product according to claim 20, wherein the sixth executable portion includes instructions for performing the determination based on a relationship between a first length of an object oriented in a first direction and a second length of the object oriented in a second direction that is substantially perpendicular to the first direction.

23. A computer program product according to claim 13, wherein the first executable portion includes instructions for binarizing the input image.

24. A computer program product according to claim 23, wherein the fifth executable portion includes instructions for modifying the current barcode reading method by switching from a global binarization to an adaptive binarization.

25. An apparatus comprising a processor and memory including computer program code, the memory and the computer program code configured to, with the processor, cause the apparatus at least to:

process an input image for an attempt to decode the input image using a current barcode reading method, the processing including performing a correction on the input image;

determine whether the processing of the input image is successful based on a determination as to whether the correction is completed;

switch to one of a different barcode reading method or processing a new frame of the input image using the current barcode reading method in response to the processing of the input image being unsuccessful;

attempt a decode of the input image using the current barcode reading method in response to the processing of the input image being successful; and perform a switch to the different barcode reading method in response to a failure of the attempt to decode the input image using the current barcode reading method.

26. An apparatus according to claim 25, wherein the memory and computer program code are further configured to, with the processor, cause the apparatus to process the input image by determining a region of interest (ROI) defining an area in which a barcode is expected.

27. An apparatus according to claim 26, wherein the memory and computer program code are further configured to, with the processor, cause the apparatus to perform the correction by correcting the ROI.

28. An apparatus according to claim 27, wherein the memory and computer program code are further configured to, with the processor, cause the apparatus to correct corner positions of the ROI based on a degree of overlap between the barcode and segments of a border of the ROI which are adjacent to each respective corner.

29. An apparatus according to claim 26, wherein the memory and computer program code are further configured to, with the processor, cause the apparatus to process the input image via performing the correction by performing re-sampling and geometric image correction.

30. An apparatus according to claim 26, wherein the memory and computer program code are further configured to, with the processor, cause the apparatus to binarize the ROI.

31. An apparatus according to claim 30, wherein the memory and computer program code are further configured to, with the processor, cause the apparatus to perform the switch to the different barcode reading method by modifying the current barcode reading method by switching from a global binarization to an adaptive binarization.

32. An apparatus according to claim 31, wherein global binarization comprises binarizing an entirety of the input image based on a relationship between input image values and a threshold and wherein adaptive binarization comprises dividing the input image into regions and separately binarizing the regions of the input image based on a relationship between a moving sum of region values compared to an adaptive threshold.

33. An apparatus according to claim 25, wherein the memory and computer program code are further configured to, with the processor, cause the apparatus to perform a determination as to whether the input image includes one of a one dimensional (1D) barcode or a two dimensional (2D) barcode.

34. An apparatus according to claim 33, wherein the memory and computer program code are further configured to, with the processor, cause the apparatus to determine a type of barcode.

35. An apparatus according to claim 34, wherein the memory and computer program code are further configured to, with the processor, cause the apparatus to determine the type of barcode based on a comparison of geometric patterns within the barcode to a known specification.

36. An apparatus according to claim 33, wherein the memory and computer program code are further configured to, with the processor, cause the apparatus to perform the determination based on a relationship between a first length of an object oriented in a first direction and a second length of the object oriented in a second direction that is substantially perpendicular to the first direction.

37. An apparatus according to claim 25, wherein the memory and computer program code are further configured to, with the processor, cause the apparatus to binarize the input image.

38. An apparatus according to claim 37, wherein the memory and computer program code are further configured to, with the processor, cause the apparatus to perform the switch to the different barcode reading method by modifying the current barcode reading method by switching from a global binarization to an adaptive binarization.

39. An apparatus according to claim 37, wherein global binarization comprises binarizing an entirety of the input image based on a relationship between input image values and a threshold and wherein adaptive binarization comprises separately binarizing two halves of the input image based on a relationship between a moving sum of input image values compared to an adaptive threshold.

40. An apparatus according to claim 25, wherein the apparatus is embodied as a mobile terminal.

41. An apparatus comprising:
  means for processing an input image for an attempt to decode the input image using a current barcode reading method, the processing including performing a correction on the input image;
  means for determining whether the processing of the input image is successful based on a determination as to whether the correction is completed;
  means for switching to one of a different barcode reading method or processing a new frame of the input image using the current barcode reading method in response to the processing of the input image being unsuccessful;
  means for attempting a decode of the input image using the current barcode reading method in response to the processing of the input image being successful; and
  means for performing a switch to the different barcode reading method in response to a failure of the attempt to decode the input image using the current barcode reading method.

* * * * *

UNITED STATES PATENT AND TRADEMARK OFFICE
CERTIFICATE OF CORRECTION

| | | |
|---|---|---|
| PATENT NO. | : 7,946,491 B2 | Page 1 of 1 |
| APPLICATION NO. | : 11/462152 | |
| DATED | : May 24, 2011 | |
| INVENTOR(S) | : Burian et al. | |

It is certified that error appears in the above-identified patent and that said Letters Patent is hereby corrected as shown below:

Column 14
Line 49, "give" should read --given--.

Signed and Sealed this
Second Day of October, 2012

David J. Kappos
*Director of the United States Patent and Trademark Office*